United States Patent [19]
Jamet et al.

[11] 3,749,928
[45] July 31, 1973

[54] ALARM DEVICE USING INFRARED EMISSION FOR DETECTION AND WARNING OF HEAT BUILD-UP

[76] Inventors: Jean Jamet, 24, rue Esquirol, 75 Paris; Louis Ponthus, 21, avenue Jean Jaures, 69 Lyon, both of France

[22] Filed: June 8, 1971

[21] Appl. No.: 150,976

[30] Foreign Application Priority Data
June 12, 1970 France ..........................7021686

[52] U.S. Cl............................250/347, 73/355 R
[51] Int. Cl.............................................. G01t 1/16
[58] Field of Search................... 250/83.3 H, 71.5 S; 73/355 R; 350/289

[56] References Cited
UNITED STATES PATENTS
3,372,230  3/1968  Wurz ......................... 250/83.3 H X
3,483,565  12/1969  Jaffe et al. .................. 250/71.5 S X
3,482,448  12/1969  Gaffard............................ 73/355 R

*Primary Examiner*—James W. Lawrence
*Assistant Examiner*—Davis L. Willis
*Attorney*—Cameron, Kerkam & Sutton

[57] ABSTRACT

An alarm device for checking the temperature of objects placed within a shielded enclosure comprises alarm means and a unit for detecting infrared radiation including a detector which is fitted with a filtering and focusing optical system. At least one orientable mirror is placed on the one hand at one end of a rotatable cylindrical sleeve which extends through the enclosure wall and to which said mirror is attached and on the other hand symmetrically with the detector with respect to a stationary mirror, the mirrors being located in optically opposite relation within the sleeve. The orientable mirror is mounted on the sleeve and capable of pivoting about two axes which are located at right angles to each other and one of which is the axis of said sleeve. The pivotal movements correspond to trajectories of detected surfaces having the shape of a hyperbola or of a hyperbolic envelope.

5 Claims, 2 Drawing Figures

ALARM DEVICE USING INFRARED EMISSION FOR DETECTION AND WARNING OF HEAT BUILD-UP

The invention relates to a device which is sensitive to infrared radiation emitted, for example, by uranium rods within a storage chamber. This device is intended to detect points of abnormal heat build-up in elements such as uranium rods for the purpose of indicating temperature rises and triggering a signal which provides a warning in the event of emission of ionizing radiations which accompany said temperature rises.

The use of this device is not necessarily limited to the nuclear field but can readily be contemplated in other industrial areas of interest. Among these may be mentioned the steel-making industry, the glass-making industry (monitoring and local analysis of furnaces, rolling facilities and the like). More generally, the device according to the invention is suitable for use in a large number of cases in which environmental conditions (such as a high temperature or a high level of radiation) are usually hazardous to conventional devices for detecting heat build-up.

Devices incorporating elements for infrared radiation detection which are sometimes derived from other industrial fields (temperature monitoring of axles of railroad cars, for example) have been proposed and employed for monitoring heat build-up in uranium rods. The detecting elements which are frequently employed in the known devices are thermocouples which are placed in proximity to the rods. Thermocouples are included in pyrometric assemblies in which evaluation of heat build-up is obtained by comparison with the ambient or room temperature but are attended by a disadvantage in that they are subjected to the influence of this temperature. Moreover, the number of devices which are necessary in order to obtain information relating to the temperature of all rods at each instant can readily be imagined.

Moreover, the presence of these detecting devices which are placed in fairly close proximity to the rods is only liable to cause hindrance when handling these latter, the more so as handling operations are carried out only by remote control by reason of the radioactivity.

Consideration could naturally be given to the possibility of installing the so-called infrared television cameras of the optical-mechanical scanning type which would permit infrared monitoring of rods. Apart from the fact that they have an optical angular field which is too small for the application which is contemplated, systems of this type would be subject to a number of disadvantages which tend to exclude their use in such applications. These disadvantages arise from the fact that the optical systems are of the glass support type in the case of the mirrors used for focusing on the detector and would accordingly suffer degradation under the action of ionizing radiations or of any temperature rise which might occur.

Furthermore, as has been pointed out by M. Jatteau and P. Wurtz in Acta Electronica 1969 (Vol. 12 No. 1 and 4), the detectors employed in these cameras operate at a low temperature respectively of 30° and 77° K in the case of Ge (Hg) and In Sb photovoltaic cells, thereby entailing the need to introduce a liquid mixture of helium-neon or of nitrogen within the storage room. This is an operational limitation of the apparatus which appears to be ill-suited to its intended function of continuous monitoring. Moreover, the preamplifier which follows the detector must always be connected to this latter by means of short leads for reasons of protection against spurious signals. In consequence, the preamplifier cannot be mounted outside the storage room, with the result that the electronic components with which it is constructed would be subjected to ionizing radiations and subsequent degradation.

The device in accordance with the invention for detecting abnormal heat build-up satisfies practical requirements much more effectively than the devices which have been cited in the foregoing: this device is insensitive to ambient temperature, to parasitic radiations (of solar origin in particular) as well as being suited to detection of hot points even in an atmosphere of ionizing radiations or of high temperature; the device does not take up any space at the level of the rods, produces information relating to all the rods and locates any temperature rise with respect to the storage floor; moreover, the operation and sensitivity of the device are such that the detector with which this latter is fitted does not call for the use of a cooling fluid.

More precisely, the invention proposes an alarm device for checking the temperature of objects placed within an enclosure which is fitted with isolating means, comprising a unit for detecting infrared radiation and alarm means, said unit being provided with an infrared detector which is fitted with a filtering and focusing optical system, characterized in that at least one orientable mirror is placed on the one hand at one end of a rotatable cylindrical sleeve which extends through the enclosure wall and to which said mirror is attached and on the other hand symmetrically with said detector with respect to a stationary mirror, said mirrors being located in optically opposite relation within said sleeve and said orientable mirror being pivotally mounted on said sleeve and adapted to be driven in two movements of rotation about two axes which are located at right angles to each other and one of which is the axis of said sleeve, said movements of rotation being such as to correspond to trajectories of detected surface having the shape of a hyperbola or of a hyperbolic envelope.

Apart from this main arrangement, the invention consists in a number of other arrangements which can be adopted either separately or preferably at the same time. The invention is directed to a number of modes of construction and application (especially detection of abnormal heat build-up in uranium rods) and by way of novel industrial products to the detection devices for the practical application of the foregoing arrangements, the elements and special tools which are employed in order to carry said arrangements into effect as well as the stationary and movable assemblies embodying devices of this type.

The invention applies particularly to a device for detecting abnormal heat build-up in uranium rods which are placed on the floor of a storage room, wherein said device essentially comprises in combination:

an optical system for collecting the radiation including infrared radiation in the storage room at the level of the uranium rods and for transmitting said radiation to the exterior of said room.

a detector fitted with infrared filtering means, the infrared radiation which is extracted from the storage element being focused on said detector.

the mechanical and electrical means serve on the one hand to orient the optical system within the storage room and on the other hand to process the data which are collected at the output of the detector element in the event of triggering of an alarm.

means for providing protection against radiations which might escape via the passage of the device through the walls of the storage room.

A better understanding of the invention will be obtained from the description of one embodiment which is given by way of non-limitative example in conjunction with the accompanying drawings, in which.

Figure 1:
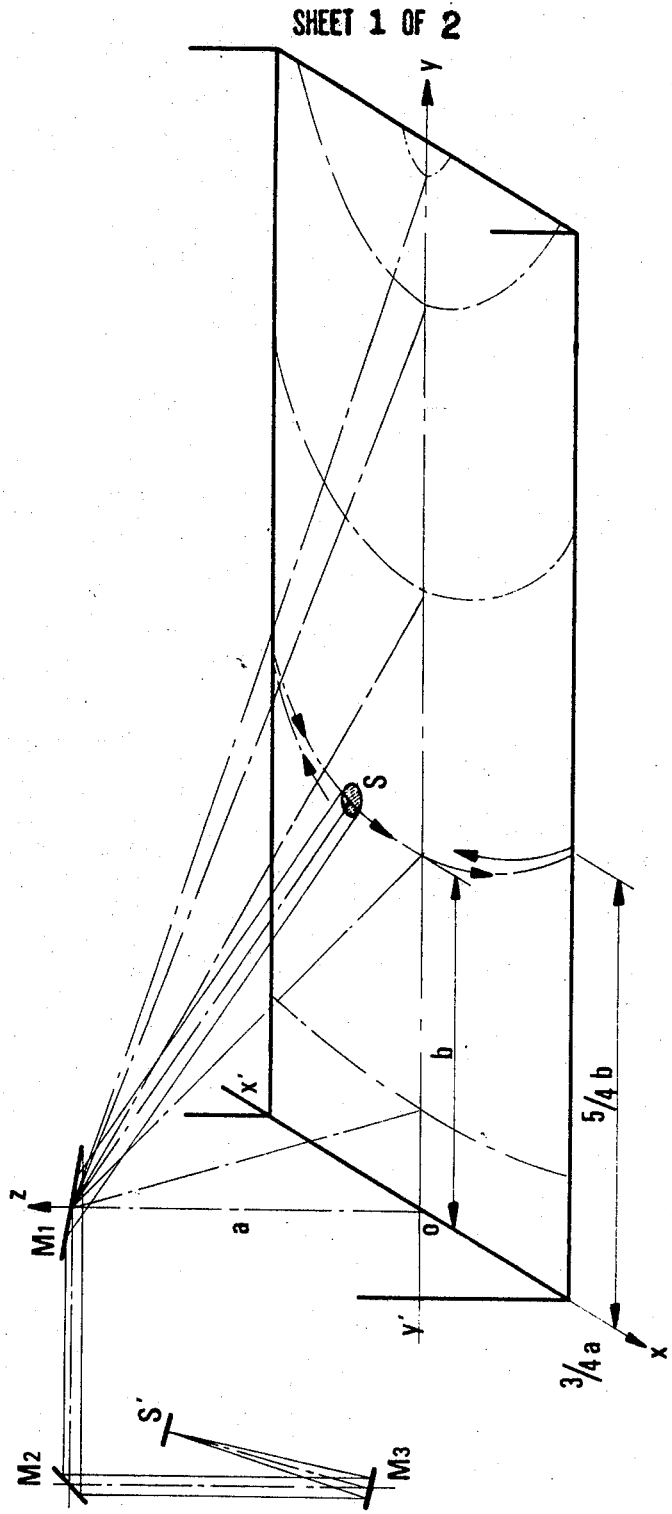
FIG. 1 is a theoretical diagram showing the endoscope panning pattern.

In FIG. 1, the plane XOY is the floor of the storage room. The mirrors $M_1$ and $M_2$ constitute the endoscope. The mirror $M_1$ is capable of moving about two perpendicular axes; one axis which is located parallel to YY' constitutes the optical axis of the endoscope whilst the other is parallel to XX'. The mirror $M_2$ is stationary and inclined at an angle of 45° to the vertical plane XOZ which is parallel to one of the vertical walls of the storage room of parallelepipedal shape through which the endoscope passes. Said mirror serves to reflect the infrared radiation to the lens $M_3$ for focusing on the detector and also performs the function of infrared filter. Taking into account a pupil which limits the field at $M_3$, for example, a correspondence is thus established between a surface area S of the radiation-emitting room and the surface area S' of the detector to which said radiation is applied.

The traces described on the ground by S as a result of the alternate movements of the above-mentioned mirror are hyperbolas which are relatively displaced in orthogonal affinities. The distance a and b indicate the dimensions of said hyperbolas.

Figure 2:
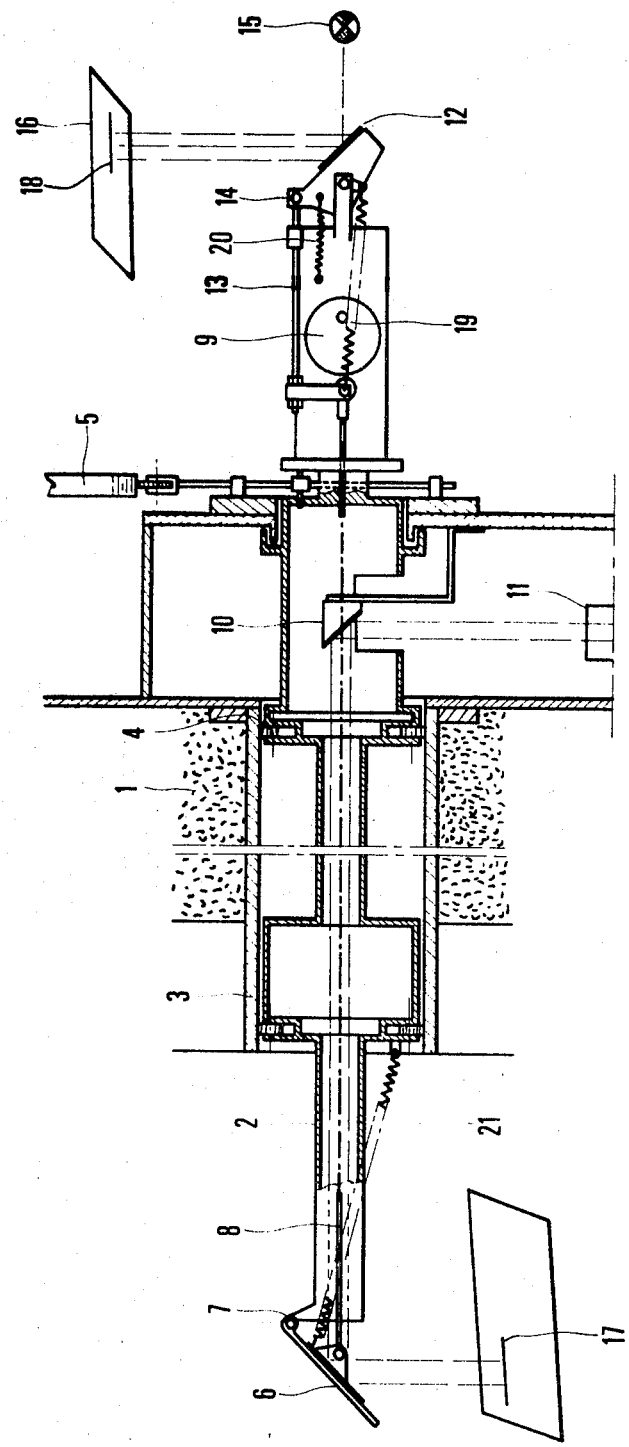
FIG. 2 is a diagrammatic profile view of the device.

One form of construction of the endoscope which is placed through a concrete wall 1 is shown in FIG. 2. The endoscope comprises a tubular sleeve 2 which is capable of pivoting about a horizontal axis within two bearings as well as sintered bronze supports 3 and 4 which permit operation without lubrication since any organic substance could be damaged as a result of gamma radiation. Movement of the sleeve is controlled by means of a cam 5. The mirror 6 is capable of pivotal movement about the pin 7 by means of the link-rod system 8 which is controlled by the cam 9, the mirror 6 corresponding to mirror $M_1$ in FIG. 1. The second mirror 10 of the endoscope is stationary and reflects the flux to the optical unit 11 for focusing and detection, the mirror 10 corresponding to mirror $M_2$ in FIG. 1. A mirror 12 or so-called copying mirror is coupled mechanically to the mirror 6 by means of link-rod systems 7 and 13 and is capable of pivoting about the pin 14. An angle of 90° is made continuously between the plane of said copying mirror and the plane of the mirror 6. Th mirror 12 produces an image of the lamp 15 or so-called copying lamp on a matrix 16 which is covered with photoelectric CdS detectors each corresponding to one of the uranium rods. In the event of triggering of an alarm, the correspondence which is thus ensured between a uranium rod 17 and a CdS cell 18 serves to localize a state of heat build-up.

The restoring springs 19, 20 and 21 form part of the mechanical linkages which have been described above.

The mirrors 6, 10, 12 are formed of stainless steel which cannot be attacked by radiations and may be cooled if necessary by means of a liquid coolant which flows through ducts in thermal contact with the metallic supports of the mirrors.

The sleeve of the endoscope is also formed of stainless steel of substantial thickness in order to form a shield against radiations emanating from the storage room. Said sleeve is therefore intended at the same time to perform a shielding function by virtue of a suitable choice of the metal of which it is formed. Moreover, the endoscope comprises a lead sheath at the end nearest the storage room.

The cams which control the two movements of rotation of the movable mirror 6 are in turn controlled by hydraulic jacks which are supplied by two separate hydraulic circuits each provided with a pump in order to prevent any jerky operation in the rotational motion of the mirror. Said circuits are fitted with flow-regulating devices which serve to adjust the speeds of rotation about each pivot-pin. One of the movements of rotation can therefore be carried out at a higher speed than the other. This possibility has an advantage: in fact, in order to ensure that all the rods may be entirely covered at least once per scan, it is only possible to contemplate transverse scanning of rods; in the case of a given rod-storage room in which the rods are placed on the floor in the lengthwise direction of the room, it is therefore possible to contemplate an installation of the endoscope through a wall which is parallel to a plane passing through XOZ or to YOZ as shown in FIG. 1; in the case of the plane XOZ, the fastest movement will be that which corresponds to the traces of S in the shape of a hyperbola; in the case of the plane YOZ, the movement of S will be a kind of sinusoid which is slowly enveloped by a hyperbola of the type mentioned above; the device thus exhibits appreciable ease of adaptation to the conditions which are dictated by industrial problems.

The constructional design described in the foregoing is employed in the case of rods located within a room having a width of 3 meters and a length of 6 meters. The height of installation of the endoscope is 2 meters and this latter is installed at the center of one of the vertical walls of greatest length.

The energy problem of detection can be stated as follows: the uranium rods are sheathed in hollow magnesium radiators each provided with four main cooling fins in the lengthwise direction and between these first fins with a plurality of secondary herringbone fins which are joined to the main fins. Heat dissipation resulting from these fins is such that heat build-up at one point of the uranium rod results in approximately one-half of said heat build-up at distances of 2.5 to 3 cm around the hot point. In consequence, if the heat build-up of uranium attains 300° C, it will only attain 150° at a distance of 3 cm. Taking these results into account and in order to set the alarm at 300° C, the detection threshold has been set at 150° C and the scanning pitch has been established at a maximum value of 5 cm.

The surface area S which is in optical correspondence with the detector cell is chosen so as to be as large as possible and remains contained within a circle of 7 cm as imposed by the dimensions of the radiator. The detected light beam is practically constant to within 10 percent in order to ensure that the energy received by the detector is a function only of the luminance of the rods. Said rods in any case behave virtually as a black body and in accordance with Lambert's law up to angles of inclination greater than 80° with respect to the normal. The variation of the angle of inclination of the beam derived from S and falling on M therefore does not have any contributory function in the triggering of the alarm system.

In the device in accordance with the invention, the infrared filter which is employed is a germanium lens of type n which transmits infrared radiation within the range of 2 $\mu$m to 17 $\mu$m. It would have been possible to employ infrared filters of a different type such as lead sulphide or indium antimonide. Above 2 $\mu$m, the luminance reflected from the body under observation which would arise from the presence of artificial sources is very small compared with the luminance of thermal origin; the spectral range considered is that of passive observation (refer to Acta Electronica, Vol. 7 Oct. 63 No. 4 page 300); protection against parasitic radiations other than thermal radiations is ensured.

Taking into account the alarm threshold and the thermal emission properties of the rod, the conditions of filtering of the optical system and of the atmosphere of the emitting surface which is chosen, the variation in flux received by the detector at the time of modulation of the optical beam is of the order of 1 $\mu$W in the event of an alarm. This power to be detected is very substantial and a large number of detectors are suitable for this purpose. Only practical reasons lead to a choice of uncooled receivers. Among these, the semi-conducting thermistor bolometer or the triglycin sulphide pyroelectric bolometer are worthy of mention since their range of sensitivity extends far into the infrared region. The first bolometer is relatively slow and can scarcely be modulated above 100 cps.

On the other hand, the second bolometer mentioned above readily permits modulations of approximately 1000 cycles per second with sensitivities of 1,000 V/W and a noise power which is equivalent to 7 $10^{-10}$ Wcps$^{-9}$; thus, by adopting a detection of synchronous type and a band of 1 cps, this results in the case of the device according to the invention in an input alarm signal of 1 mV with a signal/noise ratio of 7 $10^4$.

These values are very high and result in high operational safety and reliability of the alarm system.

The fact that it is possible to modulate at high frequency secures freedom from low-frequency drift and protection against parasitic inductions at the mains supply frequency.

What we claim is:

1. An alarm device for checking the temperature of objects within an enclosure wall having isolating means, comprising a unit for detecting infrared radiation and alarm means therefore, said unit including an infrared detector having a filtering and focussing optical system, a scanning mirror having two movements passing through axes perpendicular in said enclosure at one end of a rotatable sleeve extending through said enclosure wall, a copying mirror attached to the other end of said sleeve outside of said enclosure wall, a mechanical linkage between said mirrors maintaining their reflecting surfaces at 90° relative to each other, a fixed mirror disposed at 45° with respect to the long axis of said sleeve passing through said scanning and copying mirrors, said fixed mirror reflecting the radiation from said scanning mirror to said unit for detecting infrared radiation, and photoelectric detecting means for detecting the movement of said scanning mirror optically linked to said copying mirror for localizing the infrared radiation.

2. A device in accordance with claim 1, the two movements of said scanning mirror tracing trajectories of detected surfaces having the shape of a hyperbola.

3. A device in accordance with claim 1 the two movements of said scanning mirror being adjustable whereby one movement may be reversed with respect to the other.

4. A device in accordance with claim 1, said photoelectric detecting means including a virtual point light-source producing a beam projected onto said copying mirror and reflected onto a photoelectric detecting matrix swept by said beam.

5. A device in accordance with claim 1, said sleeve being of stainless steel forming a part of said isolating means.

* * * * *

UNITED STATES PATENT OFFICE
Certificate

Patent No. 3,749,928

Patented July 31, 1973

Jean Jamet and Louis Ponthus

Application having been made by Jean Jamet and Louis Ponthus, the inventors named in the patent above identified, and Commissariat a l'Energie Atomique, Paris, France, the assignee, for the issuance of a certificate under the provisions of Title 35, Section 256, of the United States Code, deleting the name of Jean Jamet as a joint inventor, and a showing and proof of facts satisfying the requirements of the said section having been submitted, it is this 2nd day of July 1974, certified that the name of the said Jean Jamet is hereby deleted from the said patent as a joint inventor with the said Louis Ponthus.

FRED W. SHERLING,
*Associate Solicitor.*

PO-1050
(5/69)

UNITED STATES PATENT OFFICE
CERTIFICATE OF CORRECTION

Patent No. 3,749,928                    Dated July 31, 1973

Inventor(s)   Jean Jamet and Louis Ponthus

It is certified that error appears in the above-identified patent and that said Letters Patent are hereby corrected as shown below:

[76] Inventor: Louis Ponthus, 21, avenue Jean Jaures, 69 Lyon of France

Signed and sealed this 5th day of November 1974.

(SEAL)
Attest:

McCOY M. GIBSON JR.                C. MARSHALL DANN
Attesting Officer                  Commissioner of Patents